US012228870B2

(12) United States Patent
Kato

(10) Patent No.: US 12,228,870 B2
(45) Date of Patent: Feb. 18, 2025

(54) IMAGE-FORMING APPARATUS PROVIDED WITH PHOTOSENSITIVE DRUMS, DEVELOPING ROLLERS AND FIXING DEVICE AND FORMING BOTH MULTICOLOR IMAGE AND SINGLE-COLOR IMAGE PRELIMINARY

(71) Applicant: BROTHER KOGYO KABUSHIKI KAISHA, Nagoya (JP)

(72) Inventor: Sadaharu Kato, Kariya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/165,432

(22) Filed: Feb. 7, 2023

(65) Prior Publication Data

US 2023/0280683 A1 Sep. 7, 2023

(30) Foreign Application Priority Data

Mar. 4, 2022 (JP) ................................ 2022-033485

(51) Int. Cl.

*G03G 15/22* (2006.01)
*G03G 15/00* (2006.01)
*G03G 15/20* (2006.01)

(52) U.S. Cl.

CPC ....... *G03G 15/205* (2013.01); *G03G 15/6564* (2013.01); *G03G 15/757* (2013.01); *G03G 2215/2074* (2013.01)

(58) Field of Classification Search

CPC ............. G03G 15/6564; G03G 15/205; G03G 15/2039; G03G 15/08; G03G 15/0813; G03G 21/1676; G03G 21/1821; G03G 21/1864; G03G 2221/163; G03G 2221/1633; G03G 2221/1672

See application file for complete search history.

(56) References Cited

U.S. PATENT DOCUMENTS

2003/0035659 A1 2/2003 Uchiyama
2006/0127112 A1 6/2006 Ono
2021/0011416 A1* 1/2021 Sakaguchi ............ G03G 15/50
2021/0191295 A1 6/2021 Tajiri et al.

FOREIGN PATENT DOCUMENTS

JP 2003-186343 A 7/2003
JP 2006-163298 A 6/2006
JP 2015-69039 A 4/2015
JP 2021-99441 A 7/2021

* cited by examiner

*Primary Examiner* — Thomas S Giampaolo, II
(74) *Attorney, Agent, or Firm* — Merchant & Gould P.C.

(57) ABSTRACT

In an image-forming apparatus, a controller is configured to perform: in a case where the controller performs forming a multicolor image on a sheet: bringing, in response to a temperature of a fixing device reaching a first temperature lower than a fixing temperature, first and second developing rollers into contact with first and second photosensitive drums; and feeding, after a first period of time elapses from a time when the temperature of the fixing device reaches the first temperature, a sheet from a sheet tray toward the belt using a pickup roller. The controller is configured to further perform: in a case where the controller performs forming a single-color image on the sheet: bringing, after a second period of time elapses from the time when the temperature of the fixing device reaches the first temperature, the second developing roller into contact with the second photosensitive drum; and the feeding.

12 Claims, 8 Drawing Sheets

FIRST CONTACT STATE (COLOR MODE)

SECOND CONTACT STATE (MONOCHROME MODE)

SEPARATED STATE
UP
DOWN
FRONT
REAR
300
310
311
312
313
314
335(330)
65K
65C
65M
65Y
63K
63C
63M
63Y

COLOR MODE

IMAGE-FORMING APPARATUS PROVIDED WITH PHOTOSENSITIVE DRUMS, DEVELOPING ROLLERS AND FIXING DEVICE AND FORMING BOTH MULTICOLOR IMAGE AND SINGLE-COLOR IMAGE PRELIMINARY

REFERENCE TO RELATED APPLICATIONS

This application claims priority from Japanese Patent Application No. 2022-033485 filed on Mar. 4, 2022. The entire content of the priority application is incorporated herein by reference.

BACKGROUND ART

Japanese Patent Application Publication No. 2021-99441 discloses an image-forming apparatus provided with a plurality of photosensitive members. Specifically, this image-forming apparatus is configured to switch between a pressure-contact state in which developing rollers are pressed against corresponding photosensitive members, and a separated state in which the developing rollers are separated from the corresponding photosensitive members. When forming a multicolor image on a sheet, the image-forming apparatus is configured to press all developing rollers against their corresponding photosensitive members for colors yellow (Y), magenta (M), cyan (C), and black (K). When forming a monochrome image on a sheet, the image-forming device is configured to separate developing rollers from photosensitive members corresponding to Y, M, and C and to press the developing roller against the photosensitive member corresponding to K. The developing rollers are separated from all corresponding photosensitive members before a print command is received.

DESCRIPTION

In FIG. 10 of Japanese Patent Application Publication No. 2021-99441, when the temperature of a fixing device in the conventional image-forming apparatus disclosed therein is a temperature Tp, which is lower than a fixing temperature T3, the image-forming apparatus sequentially rotates a processing motor (for rotating the photosensitive members), rotates a main motor (puts the conveying system in standby), and turns a developing clutch on (presses the developing rollers against the photosensitive members). When the fixing device reaches a temperature Ts, which is higher than the temperature Tp but lower than the fixing temperature T3, a pickup roller in the image-forming apparatus feeds a sheet from a paper tray.

In this way, since sheet conveyance in the conventional image-forming apparatus begins once the temperature of the fixing device has reached the temperature Ts, the timing at which the sheet reaches a transfer unit may not be appropriate for the timing at which a developing device is ready. One potential cause of this inappropriate timing is that the conveying distance from the sheet pickup position to the transfer unit where the first transfer is performed differs when forming multicolor images and when forming monochrome images, but the conventional technology does not take this difference into account. Another reason is that the conventional apparatus does not account for the speed at which the temperature of the fixing device rises to the temperature Ts. That is, if the temperature rises to the temperature Ts quickly, the sheet will reach the transfer unit before the developing device is ready, while if the temperature rises to the temperature Ts slowly, the developing device will be rotated unnecessarily while waiting for the sheet to arrive.

In view of the foregoing, it is an object of the present disclosure to provide a technology for ensuring the timing at which the sheet reaches the transfer unit is appropriate for the timing at which the developing device is ready.

In order to attain the above and other object, according to one aspect, the present disclosure provides an image-forming apparatus including: a sheet tray; a pickup roller; a belt; a first photosensitive drum; a second photosensitive drum; a first developing roller; a second developing roller; a fixing device; and a controller. The sheet tray is configured to accommodate a sheet therein. The pickup roller is configured to feed the sheet from the sheet tray. The belt is configured to move in first direction. The belt is to be used when a developer image is transferred onto the sheet. The first photosensitive drum is rotatable about an axis extending in a second direction. The first photosensitive drum is in contact with the belt at a first position. The second photosensitive drum is rotatable about an axis extending in the second direction. The second photosensitive drum is in contact with the belt at a second position positioned downstream of the first position in the first direction. The first developing roller is movable between a position in which the first developing roller is in contact with the first photosensitive drum and a position in which the first developing roller is separated from the first photosensitive drum. The second developing roller is movable between a position in which the second developing roller is in contact with the second photosensitive drum and a position in which the second developing roller is separated from the second photosensitive drum. The fixing device is configured to fix the developer image transferred on the sheet. The controller is configured to perform: (a) raising; and (b) causing. The (a) raising raises, by causing the fixing device to generate heat, a temperature of the fixing device up to a fixing temperature. The (b) causing causes the first photosensitive drum and the second photosensitive drum to rotate and causes the belt to move in the first direction. The controller is configured to further perform: in a case where the controller performs forming a multicolor image on the sheet: (c) bringing; and (d) feeding; and in a case where the controller performs forming a single-color image on the sheet: (e) bringing; and (f) feeding. The (c) bringing brings, in response to the temperature of the fixing device reaching a first temperature lower than the fixing temperature, the first developing roller into contact with the first photosensitive drum and the second developing roller into contact with the second photosensitive drum. The (d) feeding feeds, after a first period of time elapses from a time when the temperature of the fixing device reaches the first temperature, the sheet from the sheet tray toward the belt using the pickup roller. The (e) bringing brings, after a second period of time elapses from the time when the temperature of the fixing device reaches the first temperature, the second developing roller into contact with the second photosensitive drum. The (f) feeding feeds, after the first period of time elapses from the time when the temperature of the fixing device reaches the first temperature, the sheet from the sheet tray toward the belt using the pickup roller.

In the above structure, the image-forming apparatus is configured to feed a sheet from the sheet tray to the belt once a first period of time has elapsed after the temperature of the fixing device reaching a first temperature, regardless of whether a multicolor image or a single-color image is being formed on the sheet. However, the controller controls the first developing roller to contact the first photosensitive drum and the second developing roller to contact the second photosensitive drum once the temperature of the fixing unit has reached the first temperature when forming a multicolor image on a sheet, while the controller controls the second developing roller to contact the second photosensitive drum once a second period of time has elapsed after the temperature of the fixing device reaching the first temperature when forming a single-color image on a sheet. This method enables the timing at which the first developing roller contact the first photosensitive drum and the second developing roller contacts the second photosensitive drum to be set while accounting for the difference in timings at which images are formed on the first photosensitive drum and the second photosensitive drum during multicolor image formation and single-color image formation. On the other hand, the timing at which sheets are fed from the sheet tray is uniformly set to the timing at which the first period of time has elapsed after the temperature of the fixing device reaching the first temperature, regardless of whether a multicolor image or a single-color image is being formed. This enables the image-forming apparatus to set suitable timings at which the first developing roller contacts the first photosensitive drum and the second developing roller contacts the second photosensitive drum and at which the fixing device is ready.

According to another aspect, the present disclosure provides an image-forming apparatus including: a sheet tray; a pickup roller; a transfer unit; a first photosensitive drum; a second photosensitive drum; a first developing roller; a second developing roller; a separation mechanism; a fixing device; and a controller. The sheet tray is configured to accommodate a sheet therein. The pickup roller is configured to feed the sheet from the sheet tray. The transfer unit is configured to transfer a developer image onto the sheet. The transfer unit has a belt. The belt is configured to move in a first direction. The first photosensitive drum is rotatable about an axis extending in a second direction. The first photosensitive drum is in contact with the belt at a first position. The second photosensitive drum is rotatable about an axis extending in the second direction. The second photosensitive drum is in contact with the belt at a second position positioned downstream of the first position in the first direction. The first developing roller is configured to supply a first-color toner on the first photosensitive drum. The second developing roller is configured to supply a-second color toner on the second photosensitive drum. The separation mechanism is configured to place the first developing roller and the second developing roller in one of: a first contact state; a second contact state; and a separated state. In the first contact state, the first developing roller is in contact with the first photosensitive drum and the second developing roller is in contact with the second photosensitive drum. In the second contact state, the first developing roller is in contact with the first photosensitive drum and the second developing roller is separated from the second photosensitive drum. In the separated state, the first developing roller is separated from the first photosensitive drum and the second developing roller is separated from the second photosensitive drum. The fixing device is configured to fix the developer image transferred on the sheet. The controller is configured to perform: (a) placing; (b) raising; and (c) causing. The (a) placing places the first developing roller and the second developing roller in the separated state. The (b) raising raises, by causing the fixing device to generate heat, a temperature of the fixing device up to a fixing temperature. The (c) causing causes the first photosensitive drum and the second photosensitive drum to rotate and causes the belt to move in the first direction. The controller is configured to further perform: in a case where the controller performs forming a multicolor image on the sheet: (d) placing; and (e) feeding; and in a case where the controller performs forming a single-color image on the sheet: (f) placing; and (g) feeding. The (d) placing places, in response to the temperature of the fixing device reaching a first temperature lower than the fixing temperature, the first developing roller and the second developing roller in the first contact state. The (e) feeding feeds, after a first period of time elapses from a time when the temperature of the fixing device reaches the first temperature, the sheet from the sheet tray toward the belt using the pickup roller. The (f) placing places, after a second period of time elapsed from the time when the temperature of the fixing device reaches the first temperature, the first developing roller and the second developing roller in the second contact state. The (g) feeding feeds, after the first period of time elapses from the time when the temperature of the fixing device reaches the first temperature, the sheet from the sheet tray toward the belt using the pickup roller.

Figure 1:
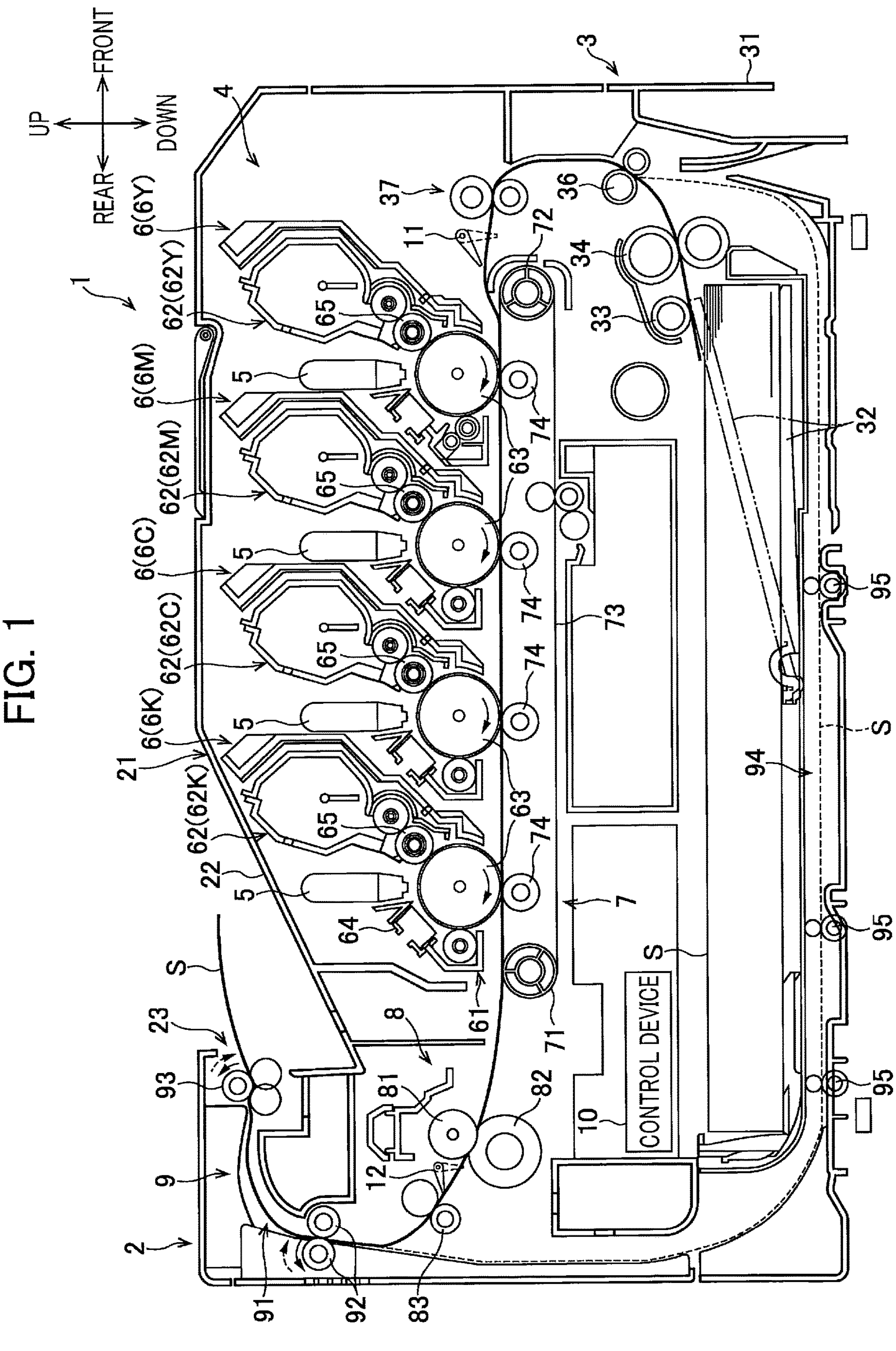
FIG. 1 is a schematic diagram illustrating the configuration of a color printer according to one embodiment of the present disclosure.

Below, a color printer 1 according to one embodiment of the present disclosure will be described in detail while referring to the accompanying drawings. In the following description, directions will be referenced from the perspective of a user operating the color printer 1. Specifically, when using FIG. 1 as an example, the right side of the color printer 1 in FIG. 1, which is the near side from the perspective of the user, will be called the "front"; the left side of the color printer 1 in FIG. 1, which is the far side from the perspective of the user, will be called the "rear"; the near side of the drawing in FIG. 1 will be called the "left"; and the far side of the drawing will be called the "right". The up-down directions in FIG. 1 will be called "up" and "down".

The color printer 1 is configured to form images on both sides of a sheet S, such as a recording paper or transparency. As illustrated in FIG. 1, the color printer 1 primarily includes a main casing 2 and, disposed inside the main casing 2, a sheet-feeding unit 3, an image-forming unit 4, and a conveying unit 9.

The main casing 2 primarily has an upper cover 21, a discharge tray 22, and a discharge opening 23. The upper cover 21 is configured to open and close by pivoting up and down around a rotational axis (not illustrated) provided at the rear of the main casing 2. The discharge tray 22 supports sheets S on which images have been formed. After image formation, the sheets S are discharged through the discharge opening 23 into the discharge tray 22.

The sheet-feeding unit 3 is disposed in the bottom section of the main casing 2. The sheet-feeding unit 3 is primarily provided with a sheet tray 31 that accommodates sheets S, a sheet-pressing plate 32, a pickup roller 33, a separating roller 34, a conveying roller 36, and a registration roller 37. The sheet-pressing plate 32 of the sheet-feeding unit 3 presses the sheets S in the sheet tray 31 toward the pickup roller 33, and the pickup roller 33 feeds sheets S in the sheet tray 31 toward the image-forming unit 4. The separating roller 34 separates the sheets S fed from the sheet tray 31 into single sheets that the conveying roller 36 and registration roller 37 supply one at a time to the image-forming unit 4.

The image-forming unit 4 is configured to form images by transferring toner images onto sheets S. The image-forming unit 4 is primarily provided with four exposure heads 5, four process units 6, a transfer unit 7, and a fixing unit 8.

The exposure heads 5 are disposed above to face corresponding photosensitive drums 63. Each exposure head 5 is provided with light-emitting elements of an LED array (not illustrated) arrayed in the left-right direction along the bottom edge of the exposure head 5. The exposure head 5 exposes the top surface of the corresponding photosensitive drum 63 by flashing the light-emitting elements on the basis of image data. The exposure heads 5 are retained on the upper cover 21 via retaining members (not illustrated). When the upper cover 21 is opened, the exposure heads 5 move with the upper cover 21 and separate from the photosensitive drums 63.

The process units 6 are arranged in a series in the front-rear direction in the area between the discharge tray 22 and the sheet tray 31. The process units 6 can be mounted in and removed from the main casing 2 while the upper cover 21 is open. Each process unit 6 is configured of a drum cartridge 61, and a developing cartridge 62 that is detachably mounted on the drum cartridge 61. Each drum cartridge 61 has a photosensitive drum 63, a charger 64, and the like. Each developing cartridge 62 has a developing roller 65 and, while not designated with reference numerals in the drawing, a supply roller, a thickness-regulating blade, a toner-accommodating section that holds toner for use as a developer, and the like.

The four process units 6 are designated by reference numerals 6Y, 6M, 6C, and 6K in order from front-to-rear that accommodate toner in the corresponding colors yellow, magenta, cyan, and black. In this specification and in the drawings, the letters Y, M, C, and K for the corresponding colors yellow, magenta, cyan, and black will be appended to reference numerals of the developing cartridges 62, photosensitive drums 63, and the like when identifying components associated with specific colors of toner.

The transfer unit 7 is provided in the main casing 2 between the sheet tray 31 and the process units 6. The transfer unit 7 is primarily provided with a drive roller 71, a follow roller 72, an endless conveying belt 73, and four transfer rollers 74. The conveying belt 73 is stretched around the drive roller 71 and follow roller 72 such that the outer surface of the conveying belt 73 opposes the four photosensitive drums 63 aligned in the front-rear direction. The transfer rollers 74 are arranged to oppose corresponding photosensitive drums 63 from inside the loop formed by the conveying belt 73 such that the conveying belt 73 is pinched between the transfer rollers 74 and the corresponding photosensitive drums 63.

The fixing unit 8 is disposed to the rear of the process units 6 and the transfer unit 7. The fixing unit 8 primarily includes a heating roller 81, and a pressure roller 82 that faces and presses against the heating roller 81. A heater (not illustrated) is disposed inside the heating roller 81. The heater is a halogen lamp, for example, that emits light and generates heat when energized, heating the heating roller 81 with the radiant heat.

In the image-forming unit 4, the chargers 64 uniformly charge the surfaces of the rotating photosensitive drums 63, and the corresponding exposure heads 5 expose the charged surfaces to form electrostatic latent images on the photosensitive drums 63 based on image data. In the meantime, the supply rollers supply toner from the toner-accommodating sections to the corresponding developing rollers 65, and the toner carried on the developing rollers 65 is regulated to a uniform thickness while passing between the developing rollers 65 and the thickness-regulating blades as the developing rollers 65 rotate.

The toner carried on each developing roller 65 is supplied onto the corresponding photosensitive drum 63, developing the electrostatic latent image on the photosensitive drum 63 into a visible toner image. Subsequently, the toner image on each photosensitive drum 63 is transferred onto a sheet S supplied from the sheet-feeding unit 3 as the sheet S is conveyed between the photosensitive drum 63 and the conveying belt 73. The toner images transferred onto the sheet S are thermally fixed to the sheet S as the sheet S is conveyed between the heating roller 81 and pressure roller 82, thereby forming an image on the sheet S. After the toner image is thermally fixed to the sheet S, a conveying roller 83 conveys the sheet S out of the fixing unit 8 and onto a conveying path 91.

The conveying unit 9 is configured to convey sheets S exiting the image-forming unit 4 either outside the main casing 2 or back toward the image-forming unit 4. The conveying unit 9 primarily includes the conveying path 91, a conveying roller 92, a discharge roller 93, a reconveying path 94, and a plurality of reconveying rollers 95 provided along the reconveying path 94.

The conveying path 91 extends upward from a point near the conveying roller 83, and then curves forward and extends toward the discharge opening 23. The reconveying path 94 extends downward from a point near the rear side of the conveying roller 83, curves and extends forward along the bottom of the sheet tray 31, and then curves and extends upward toward the conveying roller 36.

The conveying roller 92 and discharge roller 93 are configured to be rotatable in forward and reverse rotations. Specifically, when rotating forward as indicated by solid arrows, the conveying roller 92 and discharge roller 93 convey the sheet S from the image-forming unit 4 toward the discharge opening 23. When rotating in reverse as indicated by dashed arrows, the conveying roller 92 and discharge roller 93 convey a sheet S that has exited from the image-forming unit 4 back toward the image-forming unit 4.

When an image is being formed on only one side of a sheet S, the conveying roller 83 of the conveying unit 9 conveys the sheet S out of the image-forming unit 4, and the forward-rotating conveying roller 92 and discharge roller 93 convey the sheet S toward the discharge opening 23 and discharge the sheet S through the discharge opening 23 onto the discharge tray 22.

On the other hand, if images are being formed on both sides of the sheet S, the conveying roller 83 of the conveying unit 9 conveys the sheet S out of the image-forming unit 4, the forward-rotating conveying roller 92 and discharge roller 93 convey the sheet S toward the discharge opening 23 and are temporarily halted before the trailing edge of the sheet S passes the conveying roller 92. Subsequently, the conveying roller 92 and discharge roller 93 are rotated in reverse to guide the sheet S, which has an image formed on one side, onto the reconveying path 94. Once on the reconveying path 94 (see the dashed line), the reconveying rollers 95, conveying roller 36, and registration roller 37 supply the sheet S back to the image-forming unit 4.

After the sheet S has been resupplied to the image-forming unit 4, the image-forming unit 4 forms an image on the other side of the sheet S, and the conveying roller 83 conveys the sheet S out of the image-forming unit 4. Subsequently, the forward-rotating conveying roller 92 and discharge roller 93 of the conveying unit 9 convey the sheet S toward the discharge opening 23 and discharge the sheet S through the discharge opening 23 onto the discharge tray 22.

The color printer 1 is configured to form images in a monochrome mode and a color mode. In the monochrome mode, only the process unit 6K is used to form a black image on the sheet S. In the color mode, all process units 6Y, 6M, 6C, and 6K are used to form a multicolor image on the sheet S.

Figures 2A, 2B, 2C:
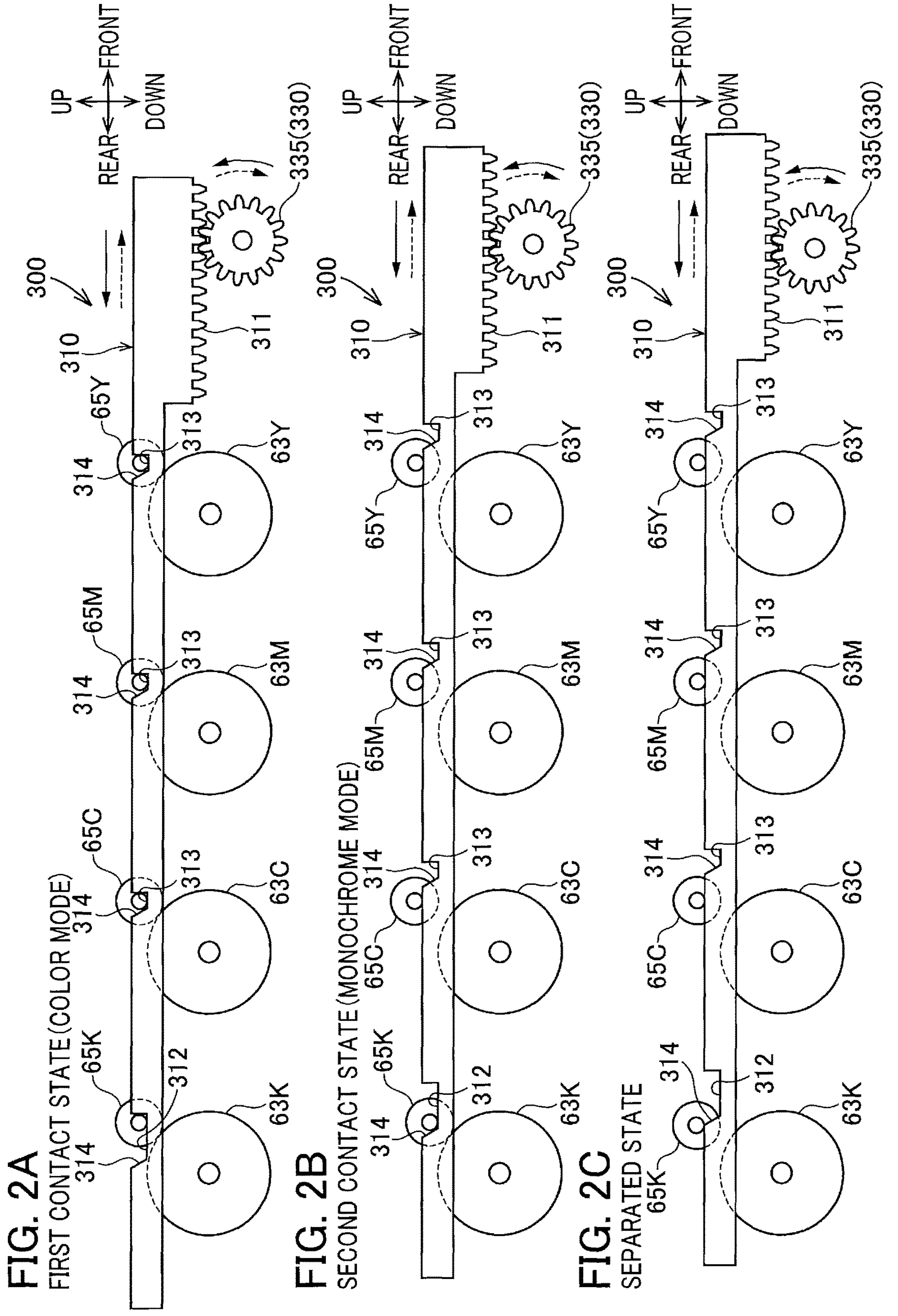
FIG. 2A is an explanatory diagram illustrating developing rollers placed in a first contact state by a separation mechanism in the color printer illustrated in FIG. 1.
FIG. 2B is an explanatory diagram illustrating the developing rollers placed in a second contact state by the separation mechanism in the color printer illustrated in FIG. 1.
FIG. 2C is an explanatory diagram illustrating the developing rollers placed in a separated state by the separation mechanism in the color printer illustrated in FIG. 1.

When the color printer 1 operates in the color mode, all developing rollers 65Y, 65M, 65C, and 65K are in contact with the corresponding photosensitive drums 63Y, 63M, 63C, and 63K as illustrated in FIG. 2A. This state will be called a first contact state. In other words, while the color printer 1 operates in the color mode, the developing rollers 65Y, 65M, 65C, and 65K are placed in the first contact state. When the color printer 1 operates in the monochrome mode, on the other hand, only the developing roller 65K contacts the corresponding photosensitive drum 63K while the developing rollers 65Y, 65M, and 65C are separated from the corresponding photosensitive drums 63Y, 63M, and 63C, as illustrated in FIG. 2B. This state will be called a second contact state. In other words, while the color printer 1 operates in the monochrome mode, the developing rollers 65Y, 65M, 65C, and 65K are placed in the second contact state.

Further, when the color printer 1 is conveying a sheet S back toward the image-forming unit 4 or when image formation is complete, all developing rollers 65Y, 65M, 65C, and 65K are separated from the corresponding photosensitive drums 63Y, 63M, 63C, and 63K, as illustrated in FIG. 2C. This state will be called a separated state. In other words, while the color printer 1 is conveying a sheet S back toward the image-forming unit 4 or after image formation is complete, the developing rollers 65Y, 65M, 65C, and 65K are placed in the separated state.

Figure 3:
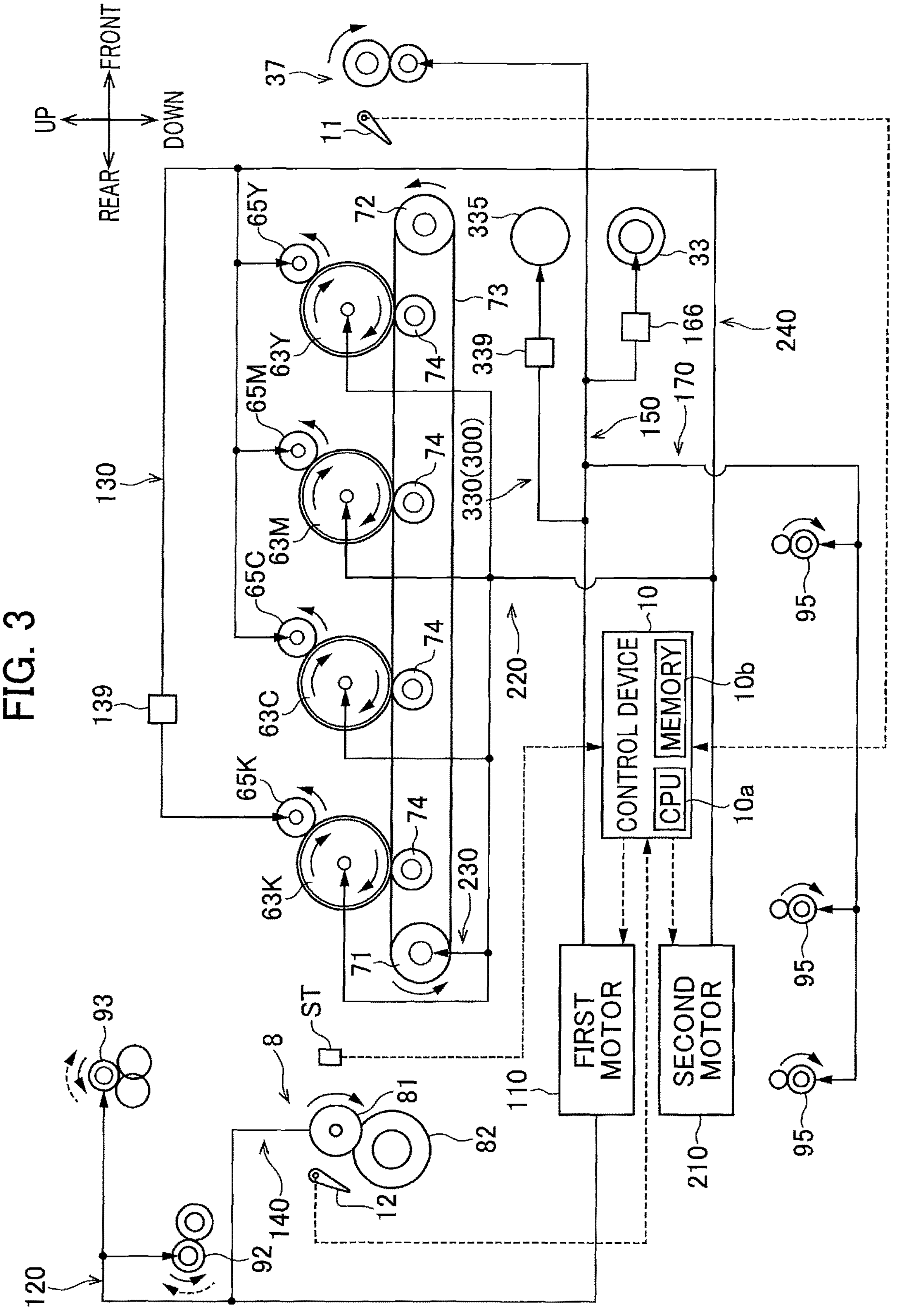
FIG. 3 is a schematic diagram illustrating the configuration of drive mechanisms in the color printer illustrated in FIG. 1.

Next, the configuration of drive mechanisms in the color printer 1 will be described. As illustrated in FIG. 3, the color printer 1 is provided with a first motor 110, a second motor 210, a switchback drive mechanism 120, a first developing drive mechanism 130, a fixing drive mechanism 140, a conveying drive mechanism 150, a reconveying drive mechanism 170, a photosensitive member drive mechanism 220, a belt drive mechanism 230, a second developing drive mechanism 240, and a separation mechanism 300.

The first motor 110 functions to apply a drive force to the conveying roller 92, discharge roller 93, and the like. The first motor 110 is configured to switch the rotating direction of an output shaft (not illustrated) supplying the drive force. By switching the rotating direction of the output shaft, the first motor 110 can rotate the conveying roller 92 and discharge roller 93 in forward or reverse directions.

The second motor 210 functions to apply a drive force to: the photosensitive drums 63Y, 63M, 63C, and 63K; the developing rollers 65Y, 65M, 65C, and 65K (developing cartridges 62Y, 62M, 62C, and 62K) that supply toner in the corresponding colors yellow, magenta, cyan, and black to the respective photosensitive drums 63Y, 63M, 63C, and 63K; the conveying belt 73; and the like. When the second motor 210 is driven, the drive shaft (not illustrated) of the second motor 210 that supplies the drive force always rotates in the same direction.

The switchback drive mechanism 120 functions to transmit the drive force of the first motor 110 to the conveying roller 92 and discharge roller 93. The switchback drive mechanism 120 is configured of a plurality of gears (not illustrated). The switchback drive mechanism 120 is configured to rotate the conveying roller 92 and discharge roller 93 forward when the output shaft of the first motor 110 is rotated in one direction (hereinafter referred to as "forward rotation") and to rotate the conveying roller 92 and discharge roller 93 in reverse when the output shaft of the first motor 110 is rotated in another direction opposite the one direction (hereinafter referred to as "reverse rotation"). Note that since the configuration and layout of gears employed in the present disclosure are widely known, detailed illustrations and descriptions of the drive mechanisms have been omitted from this specification.

The first developing drive mechanism 130 functions to transmit the drive force of the second motor 210 to the developing roller 65K (the developing cartridge 62K). The first developing drive mechanism 130 is primarily configured of a plurality of gears (not illustrated). The first developing drive mechanism 130 is further provided with a developing clutch 139. The developing clutch 139 is an electromagnetic clutch having a known configuration. The developing clutch 139 is configured to switch between a connected state enabling a drive force to be transmitted from the second motor 210 to the developing roller 65K, and a disconnected state preventing the drive force from being transmitted from the second motor 210 to the developing roller 65K.

When the developing rollers 65 are in the first contact state illustrated in FIG. 2A or the second contact state illustrated in FIG. 2B, the developing clutch 139 is in its connected state for transmitting the drive force of the second motor 210 to the developing roller 65K. When the developing rollers 65 are in the separated state illustrated in FIG. 2C, the developing clutch 139 is in its disconnected state for preventing the drive force of the second motor 210 from being transmitted to the developing roller 65K. Note that when the developing rollers 65 are being switched (the developing rollers 65 are moving) from the separated state to the first contact state or second contact state, the developing clutch 139 preferably begins transmitting the drive force from the second motor 210 to the developing roller 65K while the developing roller 65K is still in a separated state, i.e., before the developing roller 65K contacts the photosensitive drum 63K, so that the rotation of the developing roller 65K is stable when the developing roller 65K contacts the photosensitive drum 63K.

The fixing drive mechanism 140 functions to transmit the drive force of the first motor 110 to the heating roller 81. The fixing drive mechanism 140 is configured of a plurality of gears (not illustrated). The fixing drive mechanism 140 is configured to rotate the heating roller 81 clockwise in FIG. 3 when the output shaft of the first motor 110 is in forward rotation and not to transmit the drive force to the heating roller 81 when the output shaft of the first motor 110 is in reverse rotation. A temperature sensor ST for detecting the temperature of the fixing unit 8 is provided near the fixing unit 8. The temperature sensor ST detects the temperature of the heating roller 81. Output from the temperature sensor ST is inputted into a control device 10. The control device 10 can acquire detected temperatures from the temperature sensor ST at any timing.

The conveying drive mechanism 150 functions to transmit the drive force of the first motor 110 to the pickup roller 33, registration roller 37, and the like (the sheet-feeding unit 3). The conveying drive mechanism 150 is primarily configured of a plurality of gears (not illustrated). The conveying drive mechanism 150 is configured to rotate the pickup roller 33 and the like in only one direction, regardless the rotating direction of the output shaft in the first motor 110. The conveying drive mechanism 150 is also provided with a feeding clutch 166. The feeding clutch 166 is an electromagnetic clutch having a known configuration. The feeding clutch 166 is configured to switch between a connected state that enables a drive force to be transmitted from the first motor 110 to the pickup roller 33, and a disconnected state that prevents a drive force from being transmitted from the first motor 110 to the pickup roller 33.

The reconveying drive mechanism 170 functions to transmit the drive force of the first motor 110 to the reconveying rollers 95. The reconveying drive mechanism 170 is primarily configured of a plurality of gears (not illustrated). The reconveying drive mechanism 170 is configured to rotate the reconveying rollers 95 clockwise in FIG. 3, regardless the rotating direction of the output shaft in the first motor 110.

The photosensitive member drive mechanism 220 functions to transmit the drive force of the second motor 210 to the photosensitive drums 63Y, 63M, 63C, and 63K. The photosensitive member drive mechanism 220 is configured of a plurality of gears (not illustrated). The photosensitive member drive mechanism 220 is configured to rotate the photosensitive drums 63Y, 63M, 63C, and 63K clockwise in FIG. 3 when the second motor 210 is driven and to halt driving of the photosensitive drums 63Y, 63M, 63C, and 63K when the drive of the second motor 210 is halted.

The belt drive mechanism 230 functions to transmit the drive force of the second motor 210 to the drive roller 71 (the transfer unit 7). The belt drive mechanism 230 is configured of a plurality of gears (not illustrated). The belt drive mechanism 230 is configured to rotate the drive roller 71 counterclockwise in FIG. 3 when the second motor 210 is driven and to halt driving of the drive roller 71 when the drive of the second motor 210 is halted.

The second developing drive mechanism 240 functions to transmit the drive force of the second motor 210 to the developing rollers 65Y, 65M, and 65C (the developing cartridges 62Y, 62M, and 62C). The second developing drive mechanism 240 is primarily configured of a plurality of gears (not illustrated). The second developing drive mechanism 240 is configured to transmit the drive force of the second motor 210 to the developing rollers 65Y, 65M, and 65C when the developing rollers 65 are in the first contact state illustrated in FIG. 2A and not to transmit the drive force of the second motor 210 to the developing rollers 65Y, 65M, and 65C when the developing rollers 65 are in the second contact state illustrated in FIG. 2B or the separated state illustrated in FIG. 2C. Note that when the developing rollers 65 switch from the second contact state or separated state to the first contact state, the second developing drive mechanism 240 preferably transmits the drive force from the second motor 210 to the developing rollers 65Y, 65M, and 65C while the developing rollers 65Y, 65M, and 65C are still in the separated state, i.e., before the developing rollers 65Y, 65M, and 65C contact the photosensitive drums 63Y, 63M, and 63C, so that the rotation of the developing rollers 65Y, 65M, and 65C is stable when the developing rollers 65Y, 65M, and 65C contact the photosensitive drums 63Y, 63M, and 63C.

As illustrated in FIGS. 2A through 2C, the separation mechanism 300 can switch the developing rollers 65 between the first contact state illustrated in FIG. 2A, the second contact state illustrated in FIG. 2B, and the separated state illustrated in FIG. 2C. The separation mechanism 300 is primarily provided with a separation cam 310, and a separation drive mechanism 330.

The separation cam 310 is a translation cam elongated in the front-rear direction and provided along the side of the process units 6. The separation cam 310 is supported so as to be movable in the front-rear direction relative to the main casing 2. Formed in the top surface of the separation cam 310 is a single recess 312 that can engage with a rotational shaft (not designated with a reference numeral) of the developing roller 65K; three recesses 313 capable of engaging with respective rotational shafts of the developing rollers 65Y, 65M, and 65C; and sloped surfaces 314 that slope upward from front to rear, extending from the rear ends on the bottom surfaces of the respective recesses 312 and 313 to the top surface of the separation cam 310. The recess 312 is formed longer in the front-rear direction than the recesses 313. The separation cam 310 has a gear rack 311 provided in the bottom surface of the front end portion thereof.

The separation drive mechanism 330 functions to transmit the drive force of the first motor 110 to the separation cam 310. As illustrated in FIG. 3, the separation drive mechanism 330 is configured of a plurality of gears that includes a separation cam drive gear 335, and a separation clutch 339. The gear rack 311 of the separation cam 310 is meshingly engaged with some of gear teeth provided on the formed on the outer circumferential portion of the separation cam drive gear 335. The separation clutch 339 is an electromagnetic clutch having a known configuration. The separation clutch 339 is configured to switch between a connected state that enables the drive force of the first motor 110 to be transmitted to the separation cam drive gear 335, and a disconnected state that prevents the drive force from being transmitted from the first motor 110 to the separation cam drive gear 335. When the separation clutch 339 is in the connected state, the separation drive mechanism 330 is configured to rotate the separation cam drive gear 335 counterclockwise in FIGS. 2A through 2C when the output shaft of the first motor 110 is in forward rotation, and to rotate the separation cam drive gear 335 clockwise in FIGS. 2A through 2C when the output shaft of the first motor 110 is in reverse rotation.

If the first motor 110 is rotated in reverse from the first contact state illustrated in FIG. 2A, in which all developing rollers 65 contact the corresponding photosensitive drums 63, the separation cam drive gear 335 rotates clockwise in the drawing and the separation cam 310 moves forward. At this time, the rotational shafts of the developing rollers 65Y, 65M, and 65C are first among the four developing rollers 65 engaged in the recesses 312 and 313 to move upward along the corresponding sloped surfaces 314 so that the developing rollers 65Y, 65M, and 65C separate from the corresponding photosensitive drums 63Y, 63M, and 63C, as illustrated in FIG. 2B.

If the separation cam 310 is halted at this stage, the developing rollers 65 remain in the second contact state, in which only the developing roller 65K contacts the photosensitive drum 63K. If the separation cam drive gear 335 is rotated farther clockwise from the state illustrated in FIG. 2B, the separation cam 310 moves farther forward. At this time, the rotational shaft of the developing roller 65K moves upward along the corresponding sloped surface 314, and the developing roller 65K separates from the photosensitive drum 63K, as illustrated in FIG. 2C. As a result, the developing rollers 65 are in the separated state, i.e., all developing rollers 65 are separated from the corresponding photosensitive drums 63.

If the first motor 110 is rotated forward from the separated state illustrated in FIG. 2C, the separation cam drive gear 335 rotates counterclockwise in the drawings and the separation cam 310 moves rearward. At this time, the rotational shaft of the developing roller 65K is first among the four developing rollers 65 supported on the top surface of the separation cam 310 to move downward and become engaged in the corresponding recess 312, bringing the developing roller 65K into contact with the photosensitive drum 63K.

If the separation cam 310 is halted at this stage, the developing rollers 65 are in the second contact state. If the separation cam drive gear 335 continues to rotate counterclockwise from the state illustrated in FIG. 2B, the separation cam 310 moves farther rearward. At this time, the rotational shafts of the developing rollers 65Y, 65M, and 65C move downward and engage in the recesses 313 so that the developing rollers 65Y, 65M, and 65C contact the corresponding photosensitive drums 63Y, 63M, and 63C, as illustrated in FIG. 2A. As a result, the developing rollers 65 are in the first contact state.

Although the separation cam 310 is configured to be capable of engaging with the rotational shafts of the developing rollers 65 in the present embodiment, the separation cam 310 may be configured to engage with any portions of the developing cartridges 62 provided that the separation cam 310 can switch the developing rollers 65 between a state in contact with the photosensitive drums 63 and a state separated from the photosensitive drums 63.

Next, configurations for controlling the drive functions of the color printer 1 will be described. As illustrated in FIG. 1, the color printer 1 is provided with the control device 10, a first sheet sensor 11, and a second sheet sensor 12.

The first sheet sensor 11 and second sheet sensor 12 are provided for detecting sheets S being conveyed inside the main casing 2. As one example, each of the first sheet sensor 11 and second sheet sensor 12 is configured of an actuator that pivots when contacted by a sheet S, and an optical sensor that detects pivoting of the actuator. The first sheet sensor 11 is disposed between the registration roller 37 and the conveying belt 73 along the conveying path of the sheet S. The second sheet sensor 12 is disposed between the fixing unit 8 and the conveying roller 83 along the conveying path of the sheet S. In the following description, the first sheet sensor 11 and second sheet sensor 12 are in an ON state when detecting a sheet S and an OFF state when not detecting a sheet S.

The control device 10 is configured to control driving of the developing rollers 65 (the developing cartridges 62), conveying roller 92, discharge roller 93, and the like by controlling the first motor 110, second motor 210, developing clutch 139, and the like. The control device 10 is disposed at a suitable position within the main casing 2. As illustrated in FIG. 3, the control device 10 is provided with: a CPU 10*a*, which is an arithmetic unit; a memory 10*b*; an input/output interface (not illustrated); and the like.

The control device 10 executes control by performing various arithmetic processes based on programs and the like stored in the memory 10*b*, and detection results acquired from the sheet sensors 11 and 12 and the temperature sensor ST (see FIG. 3). The memory 10*b* includes ROM, RAM, flash memory, and the like. The control device 10 may be provided with an application-specific integrated circuit (ASIC) or may be configured of integrated circuits constituting a portion of an ASIC.

Figure 4:
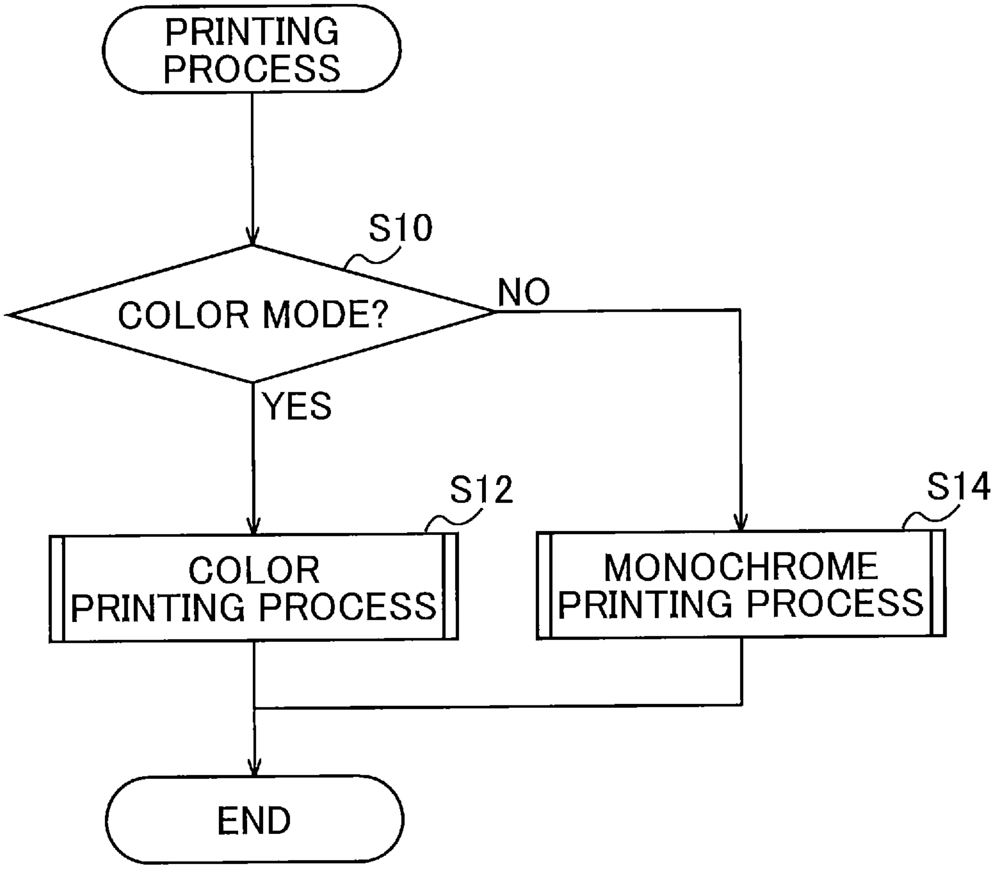
FIG. 4 is a flowchart illustrating steps in a printing process executed by a control device illustrated in FIG. 3.

Next, a control process executed by the color printer 1 having the above configuration will be described in detail with reference to FIGS. 4 through 7. FIG. 4 illustrates steps in a printing process executed by the control device 10. The control device 10 begins this printing process upon receiving a print command from an external PC (not illustrated), for example. Hereinafter, each procedure in the following processes will be indicated by a step number using "S" as an abbreviation for "step."

In S10 of FIG. 4, the control device 10 first determines whether the current printing mode of the color printer 1 is the color mode. If the current printing mode is the color mode (S10: YES), the control device 10 executes a color printing process in S12 and subsequently ends the printing process. However, if the current printing mode is not the color mode (S10: NO), i.e., when the current printing mode is the monochrome mode, the control device 10 executes a monochrome printing process in S14, and subsequently ends the printing process of FIG. 4.

Figure 5:
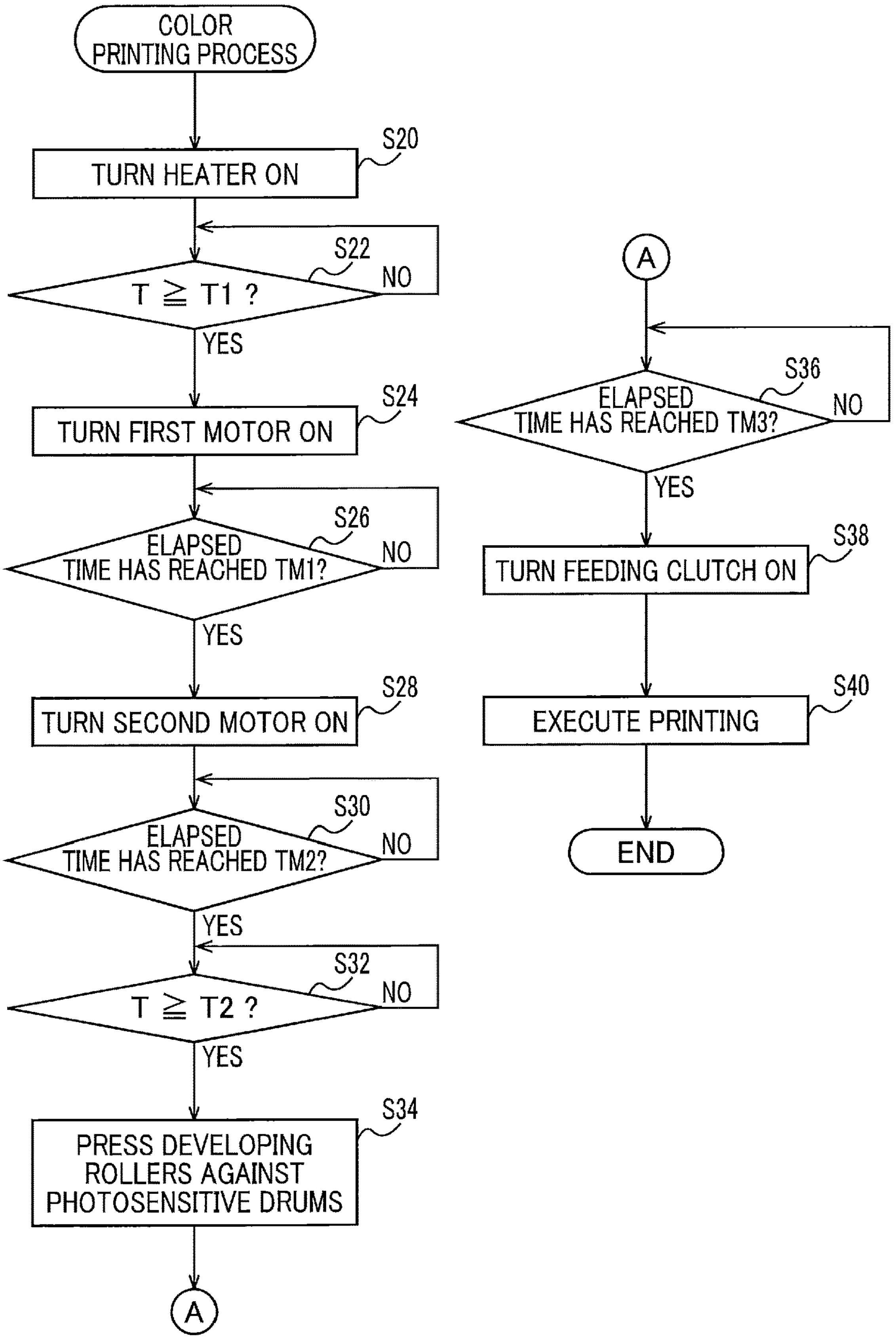
FIG. 5 is a flowchart illustrating steps in a color printing process performed in the printing process illustrated in FIG. 4.

FIG. 5 illustrates steps in the color printing process. In S20 at the beginning of FIG. 5, the control device 10 turns on (energizes) the heater in the heating roller 81. Subsequently, in S22 the control device 10 waits until a detected temperature T of the temperature sensor ST has reached a temperature T1 (S22: NO). Once the detected temperature T is greater than or equal to the temperature T1 (S22: YES), in S24 the control device 10 turns on (begins driving) the first motor 110. Here, the temperature T1 is a temperature determined in advance to be the temperature at which driving of the first motor 110 is to be started. The temperature T1 is stored in the memory 10*b*, for example.

Next, in S26 the control device 10 waits until the time elapsed after starting to drive the first motor 110 has reached a time TM1 (S26: NO). Once the elapsed time has reached the time TM1 (S26: YES), in S28 the control device 10 turns on (begin driving) the second motor 210. Here, the time TM1 is a time determined in advance to be the wait time for which the control device 10 must wait after beginning to drive the first motor 110 before starting to drive the second motor 210. The time TM1 is also stored in the memory 10*b*, for example. This elapsed time is measured by a timer, for example. The timer may be implemented by a function of the control device 10 when the control device 10 is equipped with a timer function or may be configured of a software timer in the memory 10*b* when the control device 10 is not equipped with a timer function. While FIG. 5 does not show the processes of starting, stopping, and resetting the timer and the like, the control device 10 starts, stops, and resets the timer at prescribed timings when determining the elapsed time. Specifically, the control device 10 resets and starts the timer at the same time the control device 10 turns on the first motor 110.

Thus, the time TM1 is used in the present embodiment for determining the timing at which driving of the second motor 210 is started, but a temperature Tp of the fixing unit 8 may be used instead.

In S30 the control device 10 waits until the elapsed time after starting to drive the second motor 210 has reached a time TM2 (S30: NO). Once the elapsed time has reached the time TM2 (S30: YES), the control device 10 advances to S32. Here, the time TM2 is a time determined in advance to be the wait time that the control device 10 must wait after starting to drive the second motor 210 until the second motor 210 has become stable. The time TM2 is stored in the memory 10*b*, for example.

In S32 the control device 10 waits until the detected temperature T of the temperature sensor ST is greater than or equal to a temperature T2 (S32: NO). Once the detected temperature T is greater than or equal to the temperature T2 (S32: YES), in S34 the control device 10 instructs the separation drive mechanism 330 to switch the developing rollers 65 from the separated state in FIG. 2C to the first contact state in FIG. 2A. Here, the temperature T2 is a temperature determined in advance to be the temperature at which the developing rollers 65 are allowed to be pressed against the photosensitive drums 63. The temperature T2 is stored in the memory 10*b*, for example.

Next, in S36 the control device 10 waits until the elapsed time after issuing an instruction to press the developing rollers 65 against the photosensitive drums 63 has reached a time TM3 (S36: NO). Once the elapsed time has reached the time TM3 (S36: YES), in S38 the control device 10 turns on (switches to the connected state) the feeding clutch 166. In S40 the control device 10 executes printing and subsequently ends the color printing process. Here, the time TM3 is a time determined in advance to be the wait time that the control device 10 must wait after instructing the separation drive mechanism 330 to press the developing rollers 65 against the photosensitive drums 63 before turning on the feeding clutch 166. The time TM3 is stored in the memory 10*b*, for example.

Figure 7A:
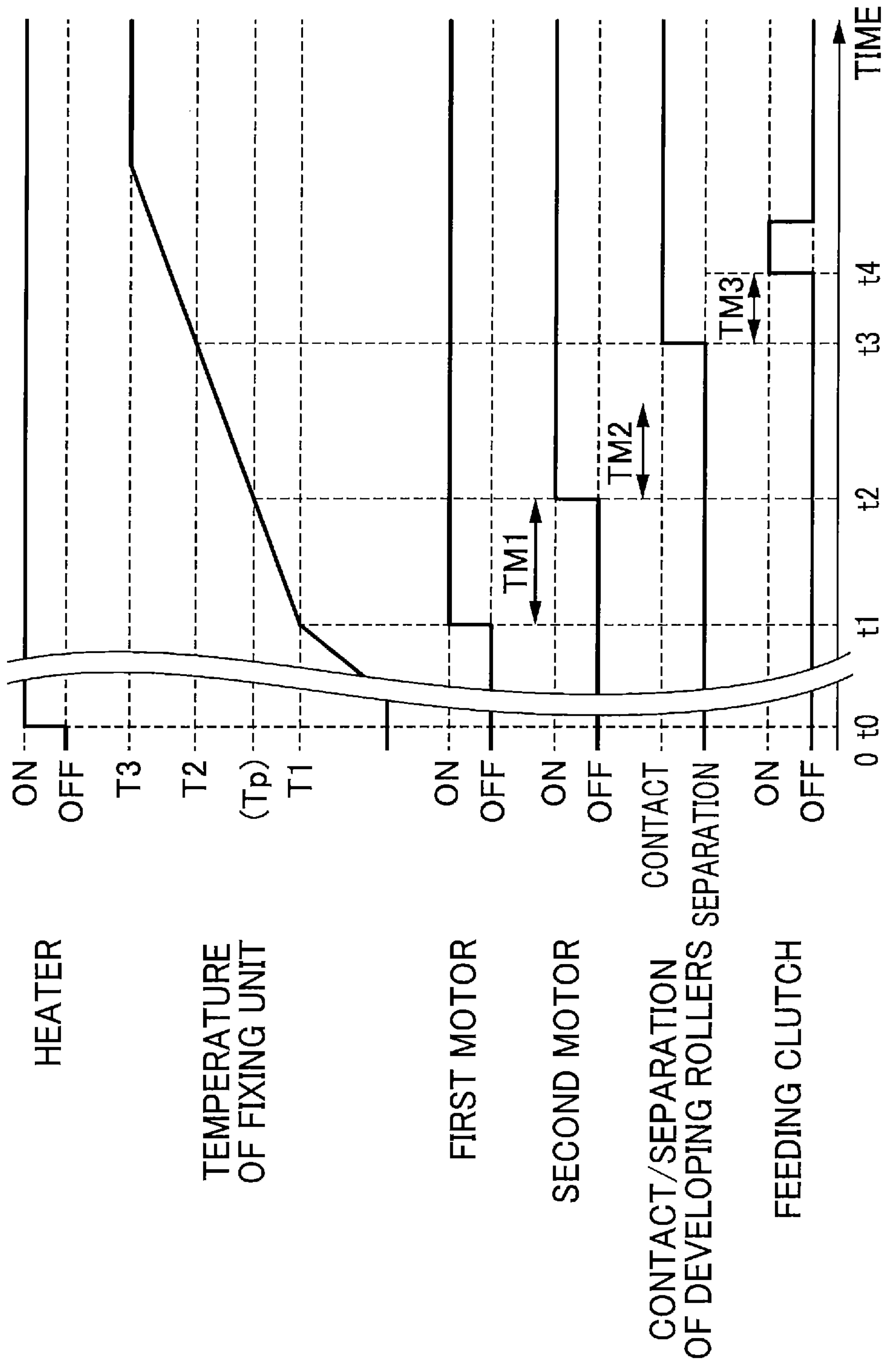
FIG. 7A is a timing chart illustrating driving states of a first motor, a second motor, developing rollers, and a feeding clutch of the color printer during a color mode.

FIG. 7A is a timing chart illustrating control timings for various components in the color printer 1 during the color mode. As illustrated in FIG. 7A, the heater is turned on at a timing t0, and the control device 10 begins driving the first motor 110 at a timing t1 at which the detected temperature T of the fixing unit 8 reaches the temperature T1. At a timing t2, which occurs a time TM1 after the timing t1, the control device 10 begins driving the second motor 210. At a timing t3, when the detected temperature T of the fixing unit 8 reaches the temperature T2 after a time TM2 has elapsed from the timing t2, the control device 10 begins pressing the developing rollers 65 against the photosensitive drums 63. At a timing t4, a time TM3 after the timing t3, the control device 10 turns the feeding clutch 166 on. In FIG. 7A, the temperature T3 denotes the temperature of the fixing unit 8 during printing (the fixing temperature). In other words, the control device 10 sets the target temperature of the detected temperature T for printing to the temperature T3 and controls the heater so that the detected temperature T is at the temperature T3 during printing.

Figure 6:
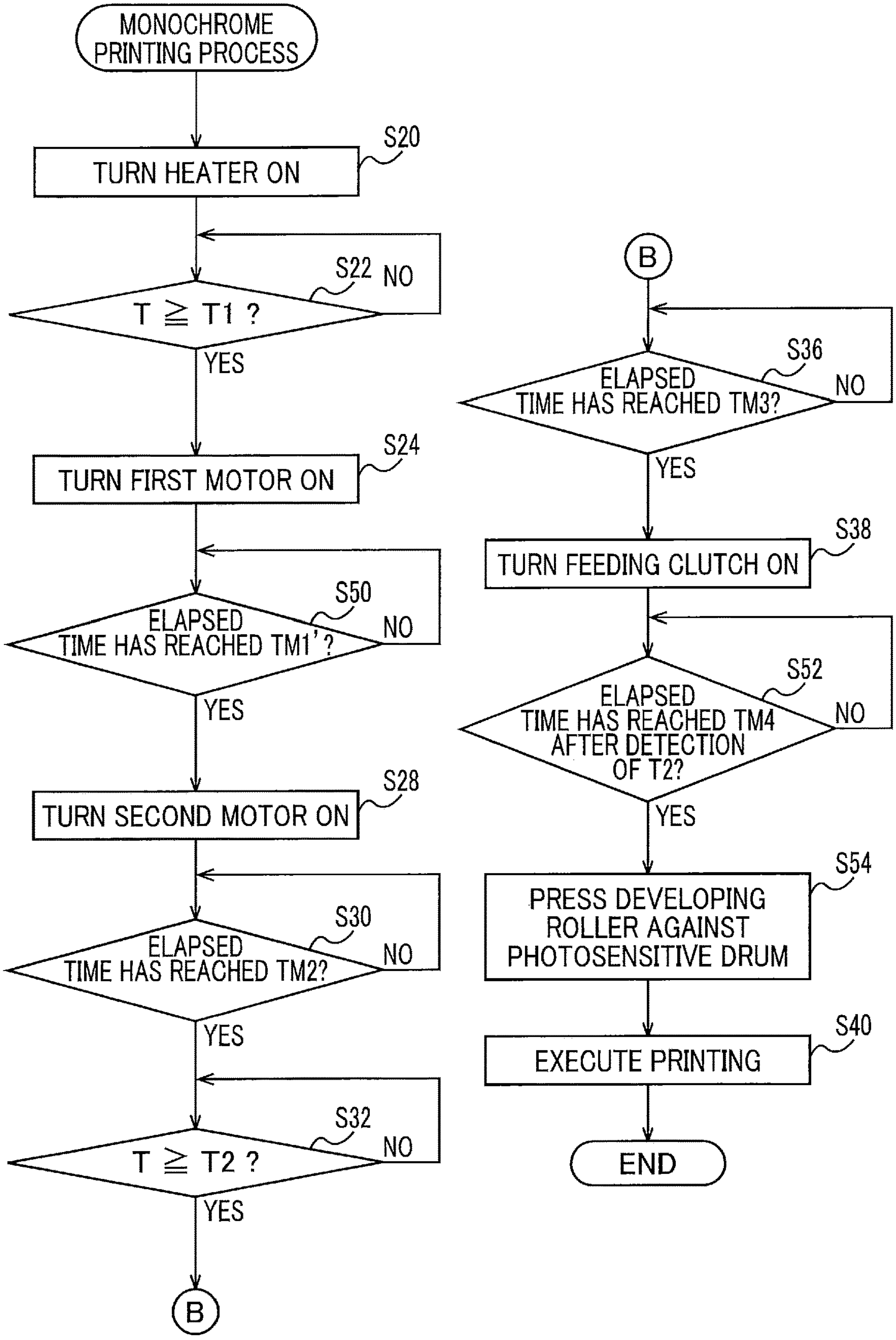
FIG. 6 is a flowchart illustrating steps in a monochrome printing process performed in the printing process illustrated in FIG. 4.

FIG. 6 illustrates steps in the monochrome printing process. Since the monochrome printing process is similar to the color printing process described above in FIG. 5 with only some modifications, the same reference numerals in FIG. 5 are used in FIG. 6, and descriptions of these processes are omitted as appropriate.

In S50 of FIG. 6, the control device 10 determines whether the time elapsed after starting to drive the first motor 110 has reached a time TM1'. That is, while the control device 10 determines in S26 of FIG. 5 whether the elapsed time after starting to drive the first motor 110 has reached a time TM1, in S50 of FIG. 6 the control device 10 determines whether this elapsed time has reached the time TM1'. Here, the relationship between time TM1' and time TM1 is TM1'>TM1. In other words, the timing at which driving of the second motor 210 is started in the monochrome mode is later than that in the color mode. This is because the second motor 210 has the function of driving the photosensitive drums 63. Accordingly, the photosensitive drums 63 begin rotating when the control device 10 begins driving the second motor 210.

Since the life of the photosensitive drums 63 is shortened as the rotating time of the photosensitive drums 63 accumulates, the life of the photosensitive drums 63 can be prolonged by suppressing their rotating time. Accordingly, the start timing for driving the second motor 210 can be delayed from the timing used for the color mode because only the photosensitive drum 63K among the four photosensitive drums 63Y, 63M, 63C, and 63K is used for printing in the monochrome mode and the photosensitive drum 63K is positioned farthest downstream in the conveying direction of the sheet S. Therefore, the control device 10 is configured to delay the timing at which driving of the second motor 210 is started.

As described for the process in S26, the temperature Tp of the fixing unit 8 may be used in place of the time TM1 for determining the start timing for driving the second motor 210 in S50. However, when the temperature of the fixing unit 8 is used in place of the time TM1', the control device 10 preferably uses a temperature Tp' that is higher than the temperature Tp because this higher temperature will delay the timing at which driving of the second motor 210 is started, thereby prolonging the life of the photosensitive drums 63.

In the color printing process described above, the control device 10 instructs the separation drive mechanism 330 to press the developing rollers 65 against the photosensitive drums 63 when the detected temperature T of the temperature sensor ST is greater than or equal to the temperature T2. However, in the monochrome printing process, the control device 10 controls the developing roller 65K to be pressed against the photosensitive drum 63K in S54 once the control device 10 determines in S52 that a time TM4 has elapsed after the timing of the rise of the detected temperature above T2. Here, the time TM4 is set in advance as the wait time that the control device 10 must wait after detecting that the temperature T has reached or exceeded the temperature T2 before the developing roller 65K can be pressed against the photosensitive drum 63K. The time TM4 is stored in the memory 10*b*, for example.

The time TM4 is determined by considering the time required for the sheet S to be conveyed from the photosensitive drum 63Y to the photosensitive drum 63K. Accordingly, a toner image on the photosensitive drum 63K is ready to be transferred onto the sheet S once the sheet S has reached the photosensitive drum 63K. Unlike the process described above in S34 for pressing all developing rollers 65 against their corresponding photosensitive drums 63, in the process of S54 the control device 10 instructs the separation drive mechanism 330 to switch the developing rollers 65 from the separated state illustrated in FIG. 2C to the second contact state illustrated in FIG. 2B. In the monochrome printing process, the control device 10 may be configured to press the developing roller 65K against the photosensitive drum 63K when the first sheet sensor 11 has detected the sheet S, rather than when the time TM4 has elapsed after the timing of the detected temperature T exceeding the temperature T2.

Figure 7B:
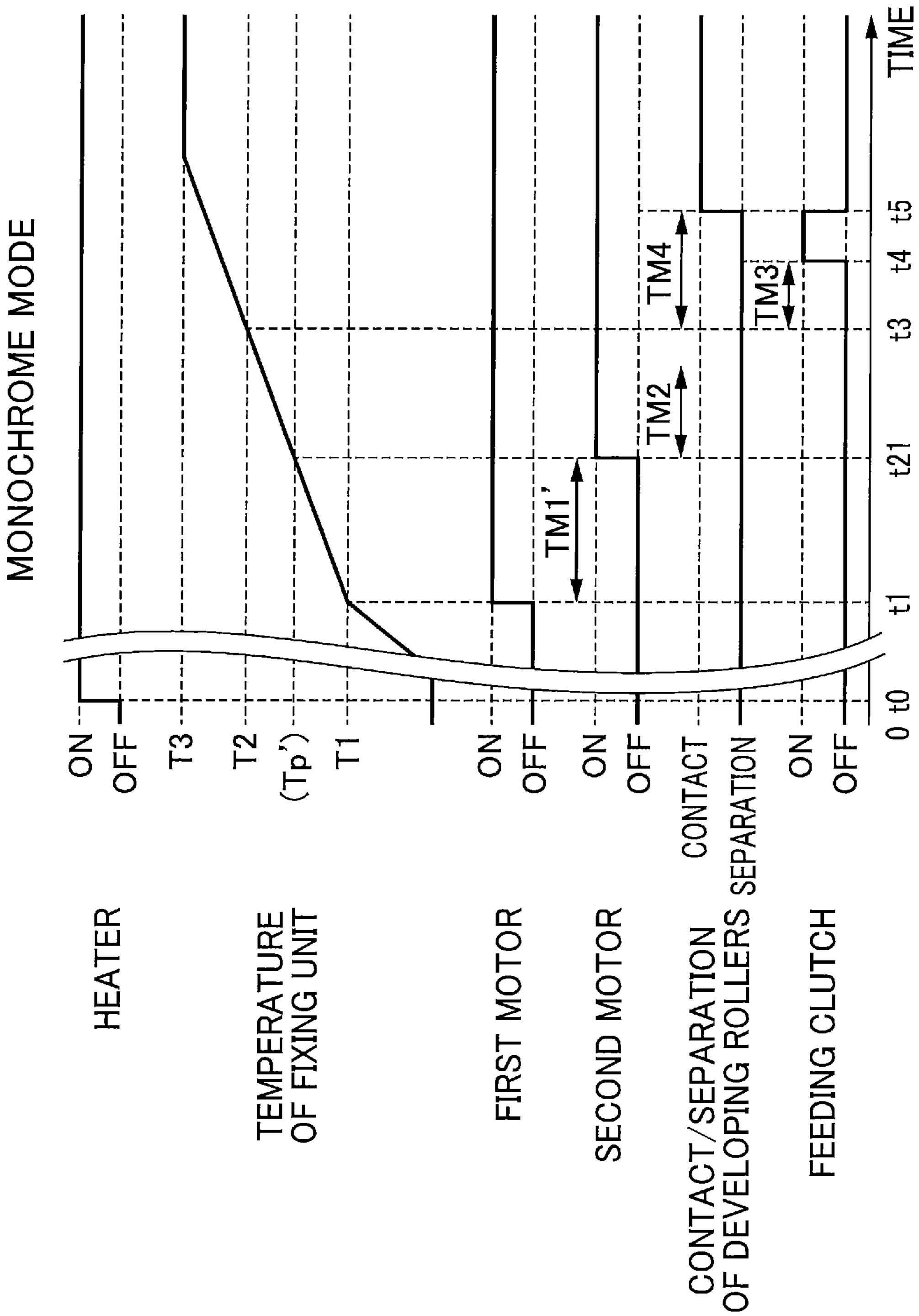
FIG. 7B is a timing chart illustrating driving states of the first motor, the second motor, the developing rollers and the feeding clutch of the color printer during a monochrome mode.

FIG. 7B is a timing chart illustrating control timings for various components in the color printer 1 during the monochrome mode. As illustrated in FIG. 7B, the heater is turned on at a timing t0, and the control device 10 begins driving the first motor 110 at a timing t2 at which the detected temperature T of the fixing unit 8 reaches the temperature T1. At a timing t21, which occurs a time TM1' after the timing t1, the control device 10 begins driving the second motor 210. The detected temperature T of the fixing unit 8 reaches the temperature T2 at a timing t3, which occurs a time TM2 following the timing t21. At a timing t4, which occurs a further time TM3 after the timing t3, the control device 10 turns on the feeding clutch 166. At a timing t5, which occurs a time TM4 after the timing t3, the control device 10 begins pressing the developing roller 65K against the photosensitive drum 63K.

Since the time TM4 is longer than the time TM3 and both times TM3 and TM4 are measured from the same starting point of the timing t3, the control device 10 begins pressing the developing roller 65K against the photosensitive drum 63K later than the timing at which the sheet S is fed from the sheet tray 31. The time TM3 has the same length in both FIGS. 7A and 7B, and measurement of the time TM3 begins at the same timing in both processes. However, the time TM3 in FIG. 7A is defined as the wait time that the control device 10 must wait after instructing the developing rollers 65 to be pressed against the photosensitive drums 63 before the control device 10 turns on the feeding clutch 166 (see the description of S36), while the time TM3 in FIG. 7B must be defined as the wait time that the control device 10 must wait after the detected temperature T of the temperature sensor ST reaches or exceeds the temperature T2 before the control device 10 can turn on the feeding clutch 166.

As described above, the color printer 1 in the present embodiment is provided with the sheet tray 31 that accommodates sheets S; the pickup roller 33 that feeds sheets S from the sheet tray 31; the conveying belt 73 that is used when transferring toner images onto sheets S; the photosensitive drum 63Y that contacts the conveying belt 73; the photosensitive drum 63K that contacts the conveying belt 73 downstream from the photosensitive drum 63Y in the circulating direction of the conveying belt 73; the developing roller 65Y that is used when forming multicolor images on sheets S and is configured to be switchable (movable) between a contact state for contacting the photosensitive drum 63Y and a separated state for separating from the photosensitive drum 63Y; the developing roller 65K that is used when forming monochrome images on sheets S and is configured to be switchable between a contact state for contacting the photosensitive drum 63K and a separated state for separating from the photosensitive drum 63K; the fixing unit 8 that fixes toner images formed on the sheets S; and the control device 10.

The control device 10 raises the temperature of the fixing unit 8 up to the fixing temperature T3 by causing the heating roller 81 to generate heat. At the same time, the control device causes the photosensitive drum 63Y and photosensitive drum 63K to rotate, and causes the conveying belt 73 to circularly move. When forming a multicolor image on a sheet S, the control device 10 places the developing rollers 65Y and 65K in contact with the corresponding photosensitive drums 63Y and 65K once the temperature of the fixing unit 8 has reached the temperature T2, which is lower than the temperature T3, and feeds a sheet S from the sheet tray 31 onto the conveying belt 73 when the time TM3 has elapsed after the temperature of the fixing unit 8 reaching the temperature T2. When forming a monochrome image on a sheet S, the control device 10 controls the developing roller 65K to contact the photosensitive drum 63K when the time TM4 has elapsed after the temperature of the fixing unit 8 reaching the temperature T2 and feeds a sheet S from the sheet tray 31 to the conveying belt 73 when the time TM3 has elapsed after the temperature of the fixing unit 8 reaching the temperature T2.

In this way, the color printer 1 of the present embodiment is configured to feed a sheet S from the sheet tray 31 to the conveying belt 73 once the time TM3 has elapsed after the temperature of the fixing unit 8 reaching the temperature T2, regardless of whether a multicolor image or a monochrome image is being formed on the sheet S. However, the color printer 1 controls the developing roller 65Y to contact the photosensitive drum 63Y once the temperature of the fixing unit 8 has reached the temperature T2 when forming a multicolor image on a sheet S, while the control device 10 controls the developing roller 65K to contact the photosensitive drum 63K once the time TM4 has elapsed after the temperature of the fixing unit 8 reaching the temperature T2 when forming a monochrome image on a sheet S.

This method enables the timing at which the developing rollers 65Y and 65K contact the corresponding photosensitive drums 63Y and 63K to be set while accounting for the difference in timings at which images are formed on photosensitive drums 63 during multicolor image formation and monochrome image formation. On the other hand, the timing at which sheets S are fed from the sheet tray 31 is uniformly set to the timing at which the time TM3 has elapsed after the temperature of the fixing unit 8 reaching the temperature T2, regardless of whether a multicolor image or a monochrome image is being formed. This enables the color printer 1 to set suitable timings at which the developing rollers 65 contact the photosensitive drums 63 and at which the fixing unit 8 is ready (the timing at which the temperature of the fixing unit 8 has reached the temperature T3 and the sheet S has arrived at the fixing unit 8).

Note that in the present embodiment, the toner image is an example of the claimed developer image. The multicolor image is an example of the claimed multicolor image, and the monochrome image is an example of the claimed single-color image. The conveying belt 73 is an example of the claimed belt. The photosensitive drum 63Y is an example of the claimed first photosensitive drum. The photosensitive drum 63Y is positioned farthest upstream in the direction in which the conveying belt 73 moves, and is used when multicolor images are formed. The photosensitive drum 63K is an example of the claimed second photosensitive member. The photosensitive drum 63K is positioned downstream of the photosensitive drum 63Y in the direction in which the conveying belt 73 moves, and is used when monochrome images are formed. The developing roller 65Y is an example of the claimed first developing roller. The developing roller 65Y is positioned farthest upstream in the direction in which the conveying belt 73 moves, and is used when multicolor images are formed. The developing roller 65K is an example of the claimed second developing roller. The developing roller 65K is positioned downstream of the developing roller 65Y in the direction in which the conveying belt 73 moves, and is used when monochrome images are formed. In this case, the toner in yellow is an example of the claimed first-color toner, and the toner in black is an example of the claimed second-color toner. The photosensitive drum 63M and developing roller 65M and the photosensitive drum 63C and developing roller 65C are also examples of the claimed first photosensitive drum and first developing roller. In this case, the toner in magenta or cyan is an example of the claimed first-color toner. The transfer unit 7 is an example of the claimed transfer unit, and the conveying belt 73 is an example of the claimed belt. The fixing unit 8 is an example of the claimed fixing device. The separation mechanism 300 is an example of the claimed separation mechanism. The control device 10 is an example of the claimed controller. The temperature T3 is an example of the claimed fixing temperature. The temperature T2 is an example of the claimed first temperature. The time TM3 is an example of the claimed first period of time. The time TM4 is an example of the claimed second period of time.

Further, the conveying belt 73 is used for conveying sheets S so that toner images can be transferred directly from the photosensitive drums 63Y and 63K onto the sheets S.

This enables the color printer 1 to set the timing at which the developing rollers 65 contact the photosensitive drums 63 while accounting differences in the conveying distance from the pickup position of the sheet S to the position at which the initial image is transferred onto the sheet S between color image formation and monochrome image formation.

The time TM4 is set longer than the time TM3.

Accordingly, when forming a monochrome image on a sheet S, the developing roller 65K is made to contact the photosensitive drum 63K after the conveyance of the sheet S has been started, thereby reducing unnecessary rotation of the developing roller 65K.

Further, the control device 10 begins rotating the photosensitive drum 63Y and photosensitive drum 63K and circularly moving the conveying belt 73 once the temperature of the fixing unit 8 has reached the temperature Tp, which is lower than the temperature T2. The temperature Tp is an example of the claimed second temperature.

Thus, the control device 10 can begin rotating each of the photosensitive drum 63Y and photosensitive drum 63K before the developing roller 65Y and developing roller 65K have been made to contact the respective photosensitive drum 63Y and photosensitive drum 63K.

The color printer 1 is also provided with the first motor 110 for driving the pickup roller 33; and the feeding clutch 166 that can switch between a connected state in which the drive force of the first motor 110 can be transmitted to the pickup roller 33, and a disconnected state in which the drive force of the first motor 110 cannot be transmitted to the pickup roller 33. The control device 10 activates the first motor 110 when the temperature of the fixing unit 8 has reached the temperature T1, which is lower than the temperature T3, and switches the feeding clutch 166 to the connected state while the first motor 110 is driving the pickup roller 33. The temperature T1 is an example of the claimed third temperature.

This allows the first motor 110 to be in a standby state when the pickup roller 33 is driven, so that the conveying time of the sheet S to the conveying belt 73 after pickup is appropriate. That is, the first motor 110 can be rotating at the target speed when the control device 10 switches the feeding clutch 166 to the connected state.

The color printer 1 is further provided with the second motor 210 for driving the developing roller 65Y and developing roller 65K. The control device 10 does not drive the developing roller 65Y and developing roller 65K while the developing roller 65Y and developing roller 65K are in the separated state but begins driving the developing roller 65Y and developing roller 65K when the developing roller 65Y and developing roller 65K are moving from the separated state toward the contact state.

Thus, the developing roller 65Y and developing roller 65K are not rotated unnecessarily in the separated state but are rotating when they reach the contact state. Hence, the developing roller 65Y and developing roller 65K can be quickly prepared to form toner images on the photosensitive drum 63Y and photosensitive drum 63K.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(1) In the embodiment described above, the color printer 1 that executes color printing using four colors of toner (Y, M, C, and K) is used as an example, but the number of colors can be more or less than four.

(2) In the embodiment described above, the color printer 1 capable of forming images on both sides of a sheet S is used as an example, but the present invention can also be applied to printers capable of forming images on only one side of a sheet S.

(3) In the embodiment described above, the stand-alone color printer 1 is used as an example, but the present invention may be applied to copiers, multifunction peripherals, or the like as well.

(4) The color printer 1 of the present embodiment described above is provided with exposure heads 5 for exposing the photosensitive drums 63, but exposure in the color printer 1 may be performed using laser scanners instead.

(5) The transfer unit 7 in the present embodiment is provided with the conveying belt 73 for conveying sheets S so that toner images can be transferred directly from the photosensitive drums 63 onto the sheets S. However, the transfer unit 7 may be provided with an intermediate transfer belt instead. In this case, toner images are initially transferred from the photosensitive drums 63 onto the intermediate transfer belt, and the intermediate transfer belt subsequently transfers those toner images onto the sheets S.

What is claimed is:

1. An image-forming apparatus comprising:

a sheet tray configured to accommodate a sheet therein;

a pickup roller configured to feed the sheet from the sheet tray;

a belt configured to move in a first direction, the belt being used when a developer image is transferred onto the sheet;

a first photosensitive drum rotatable about an axis extending in a second direction, the first photosensitive drum being in contact with the belt at a first position;

a second photosensitive drum rotatable about an axis extending in the second direction, the second photosensitive drum being in contact with the belt at a second position positioned downstream of the first position in the first direction;

a first developing roller movable between a position in which the first developing roller is in contact with the first photosensitive drum and a position in which the first developing roller is separated from the first photosensitive drum;

a second developing roller movable between a position in which the second developing roller is in contact with the second photosensitive drum and a position in which the second developing roller is separated from the second photosensitive drum;

a fixing device configured to fix the developer image transferred on the sheet; and a controller configured to perform:

(a) raising, by causing the fixing device to generate heat, a temperature of the fixing device up to a fixing temperature; and (b) causing the first photosensitive drum and the second photosensitive drum to rotate and causing the belt to move in the first direction, wherein the controller is configured to further perform:

in a case where the controller performs forming a multicolor image on the sheet:

(c) bringing, in response to the temperature of the fixing device reaching a first temperature lower than the fixing temperature, the first developing roller into contact with the first photosensitive drum and the second developing roller into contact with the second photosensitive drum; and (d) feeding, after a first period of time elapses from a time when the temperature of the fixing device reaches the first temperature, the sheet from the sheet tray toward the belt using the pickup roller; and in a case where the controller performs forming a single-color image on the sheet:

(e) bringing, after a second period of time elapses from the time when the temperature of the fixing device reaches the first temperature, the second developing roller into contact with the second photosensitive drum; and (f) feeding, after the first period of time elapses from the time when the temperature of the fixing device reaches the first temperature, the sheet from the sheet tray toward the belt using the pickup roller, and wherein the second period of time is longer than the first period of time.

2. The image-forming apparatus according to claim 1, wherein the belt is configured to convey the sheet in the first direction, and is used when a developer image is transferred directly from each of the first photosensitive drum and the second photosensitive drum onto the sheet.

3. The image-forming apparatus according to claim 1, wherein the controller performs the causing in (b) in response to the temperature of the fixing device reaching a second temperature lower than the first temperature.

4. The image-forming apparatus according to claim 1, further comprising:

a first motor configured to drive the pickup roller; and a feeding clutch switchable between a connected state in which a drive force is enabled to be transmitted from the first motor to the pickup roller and a disconnected state in which the drive force is prevented from being transmitted from the first motor to the pickup roller, wherein the controller is configured to further perform:

(g) activating, in response to the temperature of the fixing device reaching a third temperature lower than the fixing temperature, the first motor, and wherein the controller performs the feeding in (d) and the feeding in (f) by switching the feeding clutch from the disconnected state to the connected state.

5. The image-forming apparatus according to claim 1, further comprising:

a second motor configured to drive the first developing roller and the second developing roller, wherein the controller does not cause the first developing roller to be driven while the first developing roller is in the position in which the first developing roller is separated from the first photosensitive drum, and begins causing the first developing roller to be driven with the second motor when the first developing roller is moving from the position in which the first developing roller is separated from the first photosensitive drum toward the position in which the first developing roller is in contact with the first photosensitive drum.

6. An image-forming apparatus comprising:

a sheet tray configured to accommodate a sheet therein;

a pickup roller configured to feed the sheet from the sheet tray;

a transfer unit configured to transfer a developer image onto the sheet, the transfer unit having a belt configured to move in a first direction;

a first photosensitive drum rotatable about an axis extending in a second direction, the first photosensitive drum being in contact with the belt at a first position;

a second photosensitive drum rotatable about an axis extending in the second direction, the second photosensitive drum being in contact with the belt at a second position positioned downstream of the first position in the first direction;

a first developing roller configured to supply a first-color toner on the first photosensitive drum;

a second developing roller configured to supply a second-color toner on the second photosensitive drum;

a separation mechanism engageable with the first developing roller and the second developing roller to move the first developing roller relative to the first photosensitive drum and move the second developing roller relative to the second photosensitive drum;

a fixing device configured to fix the developer image transferred on the sheet; and a controller configured to perform:

(a) placing the first developing roller and the second developing roller in a separated state using the separation mechanism, the first developing roller being separated from the first photosensitive drum in the separated state, the second developing roller being separated from the second photosensitive drum in the separated state;

(b) raising, by causing the fixing device to generate heat, a temperature of the fixing device up to a fixing temperature; and (c) causing the first photosensitive drum and the second photosensitive drum to rotate and causing the belt to move in the first direction, wherein the controller is configured to further perform:

in a case where the controller performs forming a multicolor image on the sheet:

(d) placing, in response to the temperature of the fixing device reaching a first temperature lower than the fixing temperature, the first developing roller and the second developing roller in a first contact state using the separation mechanism, the first developing roller being in contact with the first photosensitive drum in the first contact state, the second developing roller being in contact with the second photosensitive drum in the first contact state; and (e) feeding, after a first period of time elapses from a time when the temperature of the fixing device reaches the first temperature, the sheet from the sheet tray toward the belt using the pickup roller; and in a case where the controller performs forming a single-color image on the sheet:

(f) placing, after a second period of time elapses from the time when the temperature of the fixing device reaches the first temperature, the first developing roller and the second developing roller in a second contact state using the separation mechanism, the first developing roller being separated from the first photosensitive drum in the second contact state, the second developing roller being in contact with the second photosensitive drum in the second contact state; and (g) feeding, after the first period of time elapses from the time when the temperature of the fixing device reaches the first temperature, the sheet from the sheet tray toward the belt using the pickup roller, and wherein the second period of time is longer than the first period of time.

7. The image-forming apparatus according to claim 6, wherein the belt is configured to convey the sheet in the first direction, and is used when a developer image is transferred directly from each of the first photosensitive drum and the second photosensitive drum onto the sheet.

8. The image-forming apparatus according to claim 6, wherein the controller performs the causing in (c) in response to the temperature of the fixing device reaching a second temperature lower than the first temperature.

9. The image-forming apparatus according to claim 6, further comprising:

a first motor configured to drive the pickup roller; and a feeding clutch switchable between a connected state in which a drive force is enabled to be transmitted from the first motor to the pickup roller and a disconnected state in which the drive force is prevented from being transmitted from the first motor to the pickup roller, wherein the controller is configured to further perform:

(h) activating, in response to the temperature of the fixing device reaching a third temperature lower than the fixing temperature, the first motor, and wherein the controller performs the feeding in (e) and the feeding in (g) by switching the feeding clutch from the disconnected state to the connected state.

10. The image-forming apparatus according to claim 6, further comprising:

a second motor configured to drive the first developing roller and the second developing roller, wherein the controller does not cause the first developing roller and the second developing roller to be driven while the first developing roller and the second developing roller are in the separated state, and begins causing the first developing roller and the second developing roller to be driven with the second motor when the first developing roller and the second developing roller are being switched from the separated state toward the first contact state.

11. The image-forming apparatus according to claim 6, further comprising:

a second motor configured to drive the first developing roller and the second developing roller, wherein the controller does not cause the first developing roller and the second developing roller to be driven while the first developing roller and the second developing roller are in the separated state, and begins causing the second developing roller to be driven with the second motor when the first developing roller and the second developing roller are being switched from the separated state toward the second contact state.

12. An image-forming apparatus comprising:

a sheet tray configured to accommodate a sheet therein;

a pickup roller configured to feed the sheet from the sheet tray;

a motor configured to drive the pickup roller;

a feeding clutch switchable between a connected state in which a drive force is enabled to be transmitted from the motor to the pickup roller and a disconnected state in which the drive force is prevented from being transmitted from the motor to the pickup roller;

a transfer unit configured to transfer a developer image onto the sheet, the transfer unit having a belt configured to move in a first direction;

a first photosensitive drum rotatable about an axis extending in a second direction, the first photosensitive drum being in contact with the belt at a first position;

a second photosensitive drum rotatable about an axis extending in the second direction, the second photosensitive drum being in contact with the belt at a second position positioned downstream of the first position in the first direction;

a first developing roller configured to supply a first-color toner on the first photosensitive drum;

a second developing roller configured to supply a second-color toner on the second photosensitive drum;

a separation mechanism configured to move the first developing roller relative to the first photosensitive drum and move the second developing roller relative to the second photosensitive drum;

a fixing device configured to fix the developer image transferred on the sheet; and a controller configured to perform:

(a) placing the first developing roller and the second developing roller in a separated state using the separation mechanism, the first developing roller being separated from the first photosensitive drum in the separated state, the second developing roller being separated from the second photosensitive drum in the separated state;

(b) raising, by causing the fixing device to generate heat, a temperature of the fixing device up to a fixing temperature; and (c) causing the first photosensitive drum and the second photosensitive drum to rotate and causing the belt to move in the first direction, wherein the controller is configured to further perform:

in a case where the controller performs forming a multicolor image on the sheet:

(d) placing, in response to the temperature of the fixing device reaching a first temperature lower than the fixing temperature, the first developing roller and the second developing roller in a first contact state using the separation mechanism, the first developing roller being in contact with the first photosensitive drum in the first contact state, the second developing roller being in contact with the second photosensitive drum in the first contact state; and (e) feeding, after a first period of time elapses from a time when the temperature of the fixing device reaches the first temperature, the sheet from the sheet tray toward the belt using the pickup roller; and in a case where the controller performs forming a single-color image on the sheet:

(f) placing, after a second period of time elapses from the time when the temperature of the fixing device reaches the first temperature, the first developing roller and the second developing roller in a second contact state using the separation mechanism, the first developing roller being separated from the first photosensitive drum in the second contact state, the second developing roller being in contact with the second photosensitive drum in the second contact state; and (g) feeding, after the first period of time elapses from the time when the temperature of the fixing device reaches the first temperature, the sheet from the sheet tray toward the belt using the pickup roller, wherein the controller is configured to further perform:

(h) activating, in response to the temperature of the fixing device reaching a second temperature lower than the fixing temperature, the motor, and wherein the controller performs the feeding in (e) and the feeding in (g) by switching the feeding clutch from the disconnected state to the connected state.

* * * * *